US008958903B1

(12) United States Patent
Rotella et al.

(10) Patent No.: US 8,958,903 B1
(45) Date of Patent: Feb. 17, 2015

(54) SYSTEM AND METHOD FOR MANAGING REASSIGNMENT OF UNITS AMONG SHIPMENTS IN A MATERIALS HANDLING FACILITY

(71) Applicant: Amazon Technologies, Inc., Reno, NV (US)

(72) Inventors: Christopher David Rotella, Seattle, WA (US); Cherie G. Wong, Seattle, WA (US); Joseph M. Alyea, Edmonds, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/088,728

(22) Filed: Nov. 25, 2013

Related U.S. Application Data

(63) Continuation of application No. 12/788,113, filed on May 26, 2010, now Pat. No. 8,682,474.

(51) Int. Cl.
  *G06F 7/00* (2006.01)
  *G06Q 10/08* (2012.01)

(52) U.S. Cl.
  CPC .................... *G06Q 10/087* (2013.01)
  USPC ........... 700/216; 700/213; 700/214; 700/215; 700/218; 700/219

(58) Field of Classification Search
  CPC ....... G06Q 40/04; G06Q 40/00; G06Q 40/06; G06Q 10/087; G06Q 10/08; G06Q 50/24
  See application file for complete search history.

(56) References Cited

U.S. PATENT DOCUMENTS

| 5,267,638 | A | 12/1993 | Doane |
| 5,395,206 | A | 3/1995 | Cerny, Jr. |
| 5,666,493 | A | 9/1997 | Wojcik et al. |
| 5,712,989 | A | 1/1998 | Johnson et al. |

(Continued)

FOREIGN PATENT DOCUMENTS

WO     2006017602     2/2006

OTHER PUBLICATIONS

Koster, Le-Duc, Zaerpour, Determining the number of zones in a pick and sort order picking system, Nov. 15, 2011, pp. 757-771.

(Continued)

*Primary Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Various embodiments of a system and method for managing reassignment of units among shipments in a materials handling facility are described. Embodiments may include a system configured to identify a first unit of a particular item that has been picked from inventory of a materials handling facility and assigned to a first shipment. The system may also, from multiple candidate shipments, identify a second shipment that requires a given unit of the particular item in order to become a complete shipment. For each candidate shipment, at least one unit of that shipment may be stored within a defined storage area of a materials handling facility. The system may, in response to identifying both shipments, generate an instruction to reassign the first unit of the particular item from the first shipment to the second shipment in order to transform the second shipment from an incomplete shipment to a complete shipment.

20 Claims, 9 Drawing Sheets

(56) References Cited

U.S. PATENT DOCUMENTS

| | | | |
|---|---|---|---|
| 5,720,157 A | 2/1998 | Ross | |
| 6,182,053 B1 | 1/2001 | Rauber et al. | |
| 6,286,292 B1 | 9/2001 | Spatafora et al. | |
| 6,289,260 B1 | 9/2001 | Bradley et al. | |
| 6,505,093 B1 | 1/2003 | Thatcher et al. | |
| 6,622,127 B1 | 9/2003 | Klots et al. | |
| 7,139,637 B1 | 11/2006 | Waddington et al. | |
| 7,499,766 B2 | 3/2009 | Knight et al. | |
| 7,979,359 B1 | 7/2011 | Young et al. | |
| 8,061,506 B2 | 11/2011 | Schafer | |
| 8,326,452 B2 * | 12/2012 | Somin et al. | 700/216 |
| 8,408,380 B2 | 4/2013 | Doane | |
| 2002/0049622 A1 | 4/2002 | Lettich et al. | |
| 2002/0188530 A1 | 12/2002 | Wojcik et al. | |
| 2004/0028777 A1 | 2/2004 | Koke et al. | |
| 2004/0153187 A1 | 8/2004 | Knight et al. | |
| 2004/0165980 A1 | 8/2004 | Huang et al. | |
| 2005/0055286 A1 | 3/2005 | Zimet | |
| 2005/0102203 A1 | 5/2005 | Keong | |
| 2005/0209732 A1 | 9/2005 | Audimoolam et al. | |
| 2006/0206235 A1 | 9/2006 | Shakes et al. | |
| 2007/0021863 A1 | 1/2007 | Mountz et al. | |
| 2007/0043468 A1 | 2/2007 | Schaefer et al. | |
| 2007/0233300 A1 | 10/2007 | Jones | |
| 2007/0283590 A1 | 12/2007 | White et al. | |
| 2008/0167884 A1 | 7/2008 | Mountz et al. | |
| 2009/0099678 A1 | 4/2009 | Kurata et al. | |
| 2009/0112675 A1 | 4/2009 | Servais | |
| 2009/0136333 A1 | 5/2009 | Schafer | |
| 2009/0143887 A1 | 6/2009 | Jones | |
| 2009/0287330 A1 | 11/2009 | Overley et al. | |
| 2009/0288996 A1 | 11/2009 | Shafer | |
| 2010/0114790 A1 | 5/2010 | Strimling et al. | |
| 2010/0274610 A1 | 10/2010 | Andersen et al. | |
| 2011/0295413 A1 * | 12/2011 | Hara et al. | 700/216 |

OTHER PUBLICATIONS

Office Action from U.S. Appl. No. 12/788,130, issued Jul. 10, 2014, pp. 1-19.

* cited by examiner

SYSTEM AND METHOD FOR MANAGING REASSIGNMENT OF UNITS AMONG SHIPMENTS IN A MATERIALS HANDLING FACILITY

This application is a continuation of U.S. application Ser. No. 12/788,113, filed May 26, 2010, which is incorporated herein by reference in its entirety.

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may operate a facility that prepares shipments of purchased items. A shipment carrier may acquire such shipments from the merchant and deliver the shipments to the respective purchasing customers.

The facilities operated by the merchant may include various fulfillment processes for fulfilling orders submitted by customers. These processes may operate on items to perform various tasks, such as preparing items for shipment. Inefficiencies in one or more of these processes may impact the overall efficiency or throughput of the entire facility. Furthermore, some resources used to carry out these processes may have fixed capacities. Inefficiently using such resources may result in the needless expenditure of capital to expand resource capacity.

While the system and method for managing reassignment of units among shipments in a materials handling facility is described herein by way of example for several embodiments and illustrative drawings, those skilled in the art will recognize that the system and method for managing reassignment of units among shipments in a materials handling facility is not limited to the embodiments or drawings described. It should be understood, that the drawings and detailed description thereto are not intended to limit the system and method for managing reassignment of units among shipments in a materials handling facility to the particular form disclosed, but on the contrary, the intention is to cover all modifications, equivalents and alternatives falling within the spirit and scope of the system and method for managing reassignment of units among shipments in a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
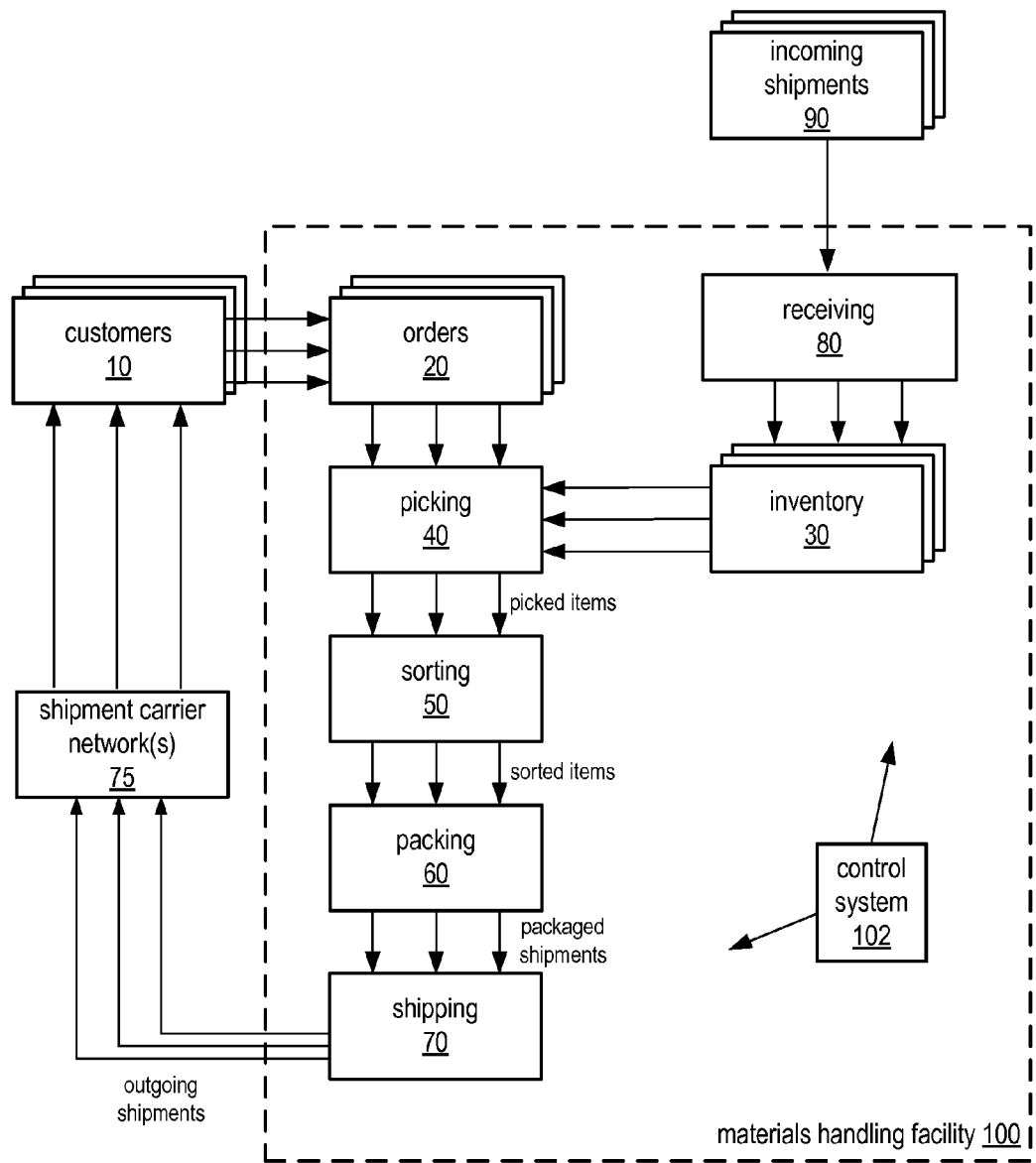
FIG. 1 illustrates a logical representation of the operations of a materials handling facility, according to some embodiments.

Various embodiments of a system and method for managing reassignment of units among shipments in a materials handling facility are described. FIG. 1 illustrates a logical representation or view of the operation of a materials handling facility 100 of various embodiments of the system and method for managing reassignment of units among shipments in a materials handling facility. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor through an e-commerce portal or other electronic marketplace, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 70 may be transferred to one or more shipment carrier network(s) 75. Each shipment carrier's network may include one or more distribution facilities for storing items as well as vehicles for conveying shipments from such distribution facilities and/or materials handling facilities (such as materials handling facility 100) to various destinations (e.g., customer specified destinations).

Figure 2:
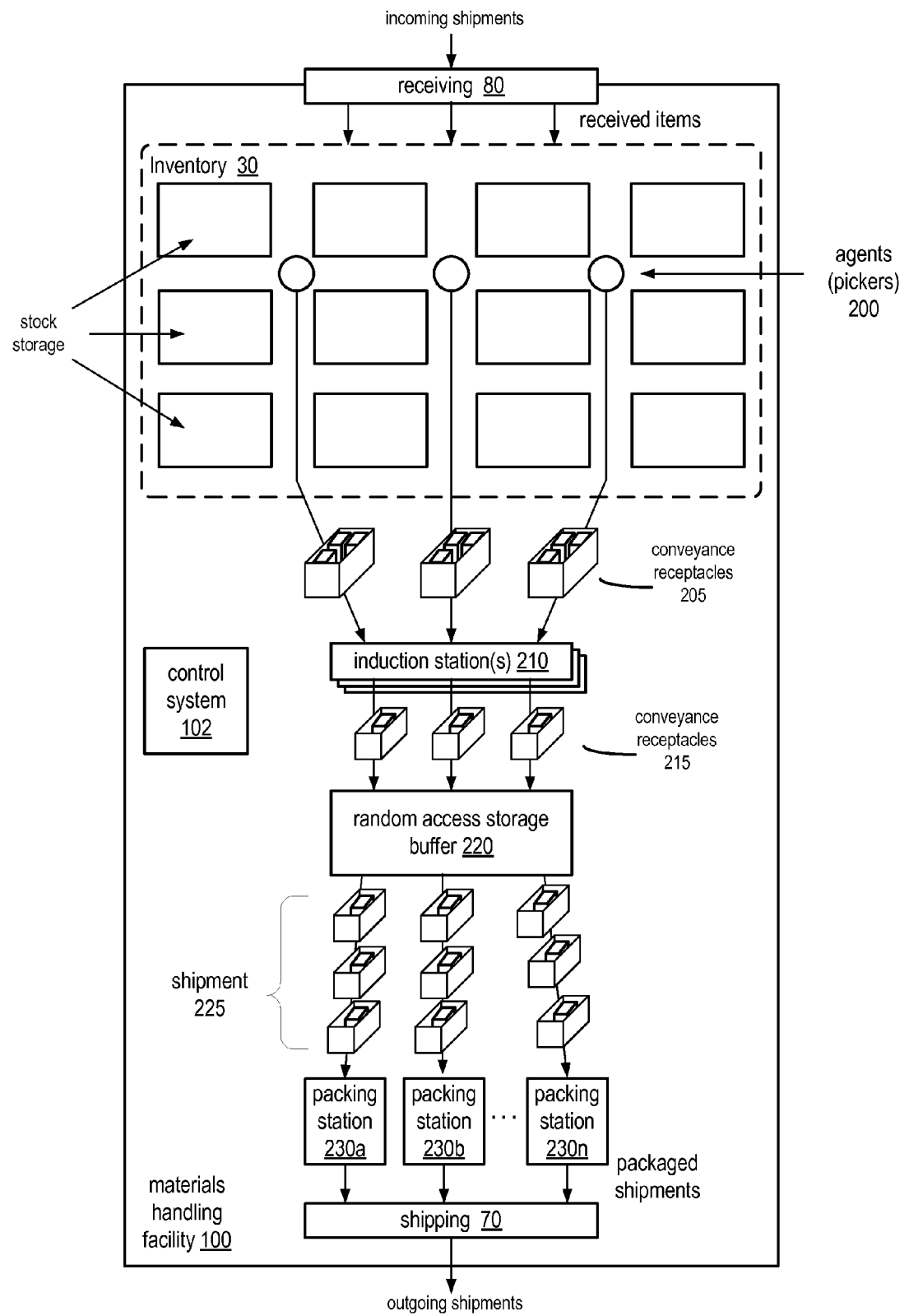
FIG. 2 illustrates an example physical layout for a materials handling facility, according to some embodiments.

FIG. 2 illustrates an exemplary physical layout of a materials handling facility, such as an order fulfillment facility or center, in which embodiments of the system and method for managing reassignment of units among shipments in a materials handling facility are implemented. Requests (e.g., orders) for items from requestors may be divided among multiple pickers 200, who then pick items from inventory storage 30. Picked units of items may be placed into conveyance receptacles 205 (e.g., totes or carts) for conveyance. The orders may be subdivided among the pickers 200; therefore, two or more of the pickers 200 may pick items for one order. The picked items may be conveyed to an induction station 210 or stations (there may be more than one induction station 210). For example, the picked items in conveyance receptacles 205 (e.g., totes) each containing one or more units of items (each possibly containing items from two or more orders) may be conveyed to any of induction stations 210 on a conveyance device (e.g., a conveyor belt).

At the induction station 210, each unit may be pulled individually from each conveyance receptacle 205. Alternatively, all items may be "dumped" into a common receptacle (a bin, basket, shelf, etc.), and individual units may then be pulled from the common receptacle. In various embodiments, each pulled unit is then placed into a conveyance receptacle 215 (e.g., a tote or tray) by itself. This process may be referred to as singulating the item. Receptacles, as used herein, may include, but are not limited to, any tote, basket, box, tray, or similar mechanism configured to receive individual units of items or groups of units of items in a materials handling facility. The conveyance receptacle 215 need not be fixed to any conveyance mechanism.

The pulled unit of an item may be associated with the particular conveyance receptacle 215 it is placed in. In one embodiment, the association of a unit of an item with a particular conveyance receptacle 215 may be performed by reading, scanning or otherwise entering an item identifier associated with the item and a conveyance receptacle identifier associated with the particular conveyance receptacle 215 into which the unit is placed. The item identifier and receptacle identifier may be communicated to a control system 102 of the materials handling facility via wired and/or wireless communications. Each conveyance receptacle 215 may include a unique conveyance receptacle identifier that uniquely identifies the particular conveyance receptacle 215 in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle 215.

Each unit of each item carried in inventory 30 may include an item identifier. A type of item held in inventory 30 may be referred to herein as simply an item. The term item identifier may refer to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual units within a type of item.

Cases, boxes, bundles, or other collections of units of items may similarly be marked or tagged with identifiers. The units of items in a collection may all be of the same type of item, for example a case of twelve units of a particular item, or may be a collection of one or more units of each of two or more heterogeneous items. A collection of units of item(s) (e.g., a case containing twelve units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, various, in addition to sorting individual units of items, may also process collections of units of item(s) designated as units. Therefore, the conveyance receptacles described herein may receive collections of units of item(s) that are designated as units as well as individual units of items.

Figure 8:
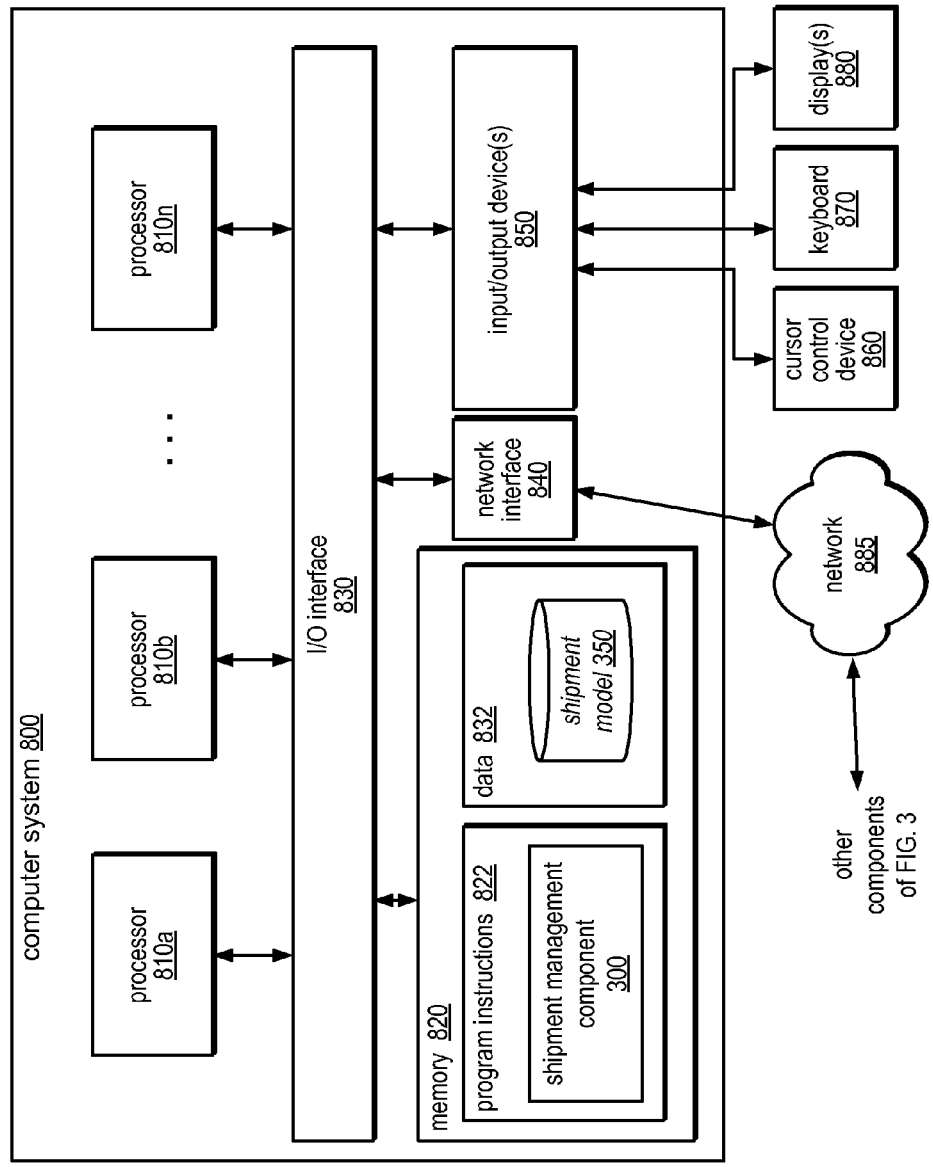
FIG. 8 illustrates one example of a computer system suitable for implementing various elements of the system and method for managing reassignment of units among shipments in a materials handling facility, according to some embodiments.

A materials handling facility may include a control system 102 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 102 is illustrated in FIG. 8.

At the induction station 210, a pulled unit of an item may be associated with a particular conveyance receptacle 215 by reading, scanning, etc. the item identifier associated with the item and the conveyance receptacle identifier associated with the conveyance receptacle 215 into the control system 102. This may be performed manually (e.g., by an operator or agent using a hand-held scanner), via an automated scanning/reading process using fixed scanners/readers, or by a combination of manual and automatic scanning/reading. For example, an operator at the induction station 210 may use a hand-held scanner to scan a code off the unit of the item before or during placement of the unit into a "staged" conveyance receptacle 215, while an automated reader may read (or may have already read) the conveyance receptacle identifier from the conveyance receptacle 215 that is "staged" for the operator to place the unit of the item into.

Once a pulled unit of an item is associated with and placed into a particular conveyance receptacle 215, the conveyance receptacle 215 may be inducted into a conveyance mechanism (e.g., a conveyor belt, roller system, or other conveyance mechanism) to be conveyed to random access storage buffer 220. In various embodiments, the conveyance mechanism may include a mechanism that includes some method of diverting a product off a conveyance path under control of the control system. Examples of such diversion mechanisms may include, but are not limited to, sliding shoe sorter mechanisms and pop up diversion mechanisms, such as pop up wheel sorter mechanisms. A pop up wheel sorter includes powered wheels that rise up out of the conveyor to divert product off the conveyor onto a different path or to a location. Other types of mechanisms may be used in various embodiments.

The conveyance receptacle 215 may already be on the conveyance mechanism when the unit is associated with and placed into the receptacle 215. Alternatively, a conveyance receptacle 215 may be retrieved from a conveyance receptacle storage, stack, or other supply, the unit may be associated with and placed into the receptacle 215, and the receptacle 215 may then be inducted into or placed on the conveyance mechanism. The conveyance receptacles 215 need not be fixed to the conveyance mechanism; instead, the receptacles 215 may be removable bins, trays, totes, or similar devices. The conveyance mechanism may be coupled to and controlled by the materials handling facility control system 102 via wired and/or wireless communications. The control system 102 may receive input from and send commands to the conveyance mechanism to direct or control various operations of the conveyance mechanism.

The above describes aspects of an induction station 210 in which a human operator performs at least a portion of the pulling of units of items from groups of picked items, scanning/reading the items and receptacles 215 to associate single units of items to particular conveyance receptacles 215, and placing the units into the conveyance receptacles 215. In alternative embodiments, some or all of the activities described as being performed by a human operator may be performed by automated mechanisms, which may be coupled to and under control of the materials handling facility control system 102.

Inducted items stored in conveyance receptacles 215 may be delivered to a random access storage buffer 220. Random access storage buffer 220 may in various embodiments be configured to store multiple conveyance receptacles (each including a unit of an item) in respective buffer locations. In some embodiments, random access storage buffer 220 may include shelving units or other physical structures with columns and rows defining addressable locations or "slots" in which one or more conveyance receptacles 215 may be stored. In some embodiments, random access storage buffer may include automated or robotic mechanisms (e.g., multi-directional lifts or elevators) that may acquire an inducted conveyance receptacle 215 and place such receptacle into a respective addressable location of the random access storage buffer. Similar mechanisms may be utilized to remove conveyance receptacles (each including an item) from random access storage buffer 220. In various embodiments, random access storage buffer may be a two-sided structure such that conveyance receptacles may be placed into addressable locations of the buffer from one side of the buffer (e.g., an ingress side) and removed from another side of the buffer (e.g., an egress side).

Note that a conveyance receptacle including an item may be stored within random access storage buffer 220 for varying quantities of time (e.g., relatively short or relatively long periods of time). In some cases, conveyance receptacles that include units of the same shipment may arrive at the random access storage buffer at different times (e.g., due to picking variabilities). In some embodiments, conveyance receptacles including such units (typically one unit per receptacle) may not be eligible to be removed or "released" from the random access storage buffer until all of such units are present within the buffer. Shipments eligible for release may be removed from random access storage buffer 220 when directed by a computer system managing the buffer.

In various embodiments, random access storage buffer 220 may be controlled by control system 102 or by a dedicated buffer management component. In various embodiments, the buffer management component may control any and/or all aspects of the random access storage buffer 220, including but not limited to the physical mechanisms (e.g., robotic arms, lifts, elevators, etc.) that control the ingress and egress of conveyance receptacles 215 into and out of random access storage buffer 220. One example of such a buffer management component is described below with respect to buffer management component 360.

In various embodiments, units may be released from random access storage buffer 220 and provided to a respective one of packing stations 230a-230n (collectively referred to as packing stations 230) on a per shipment basis. For instance, the conveyance receptacles including units that makeup shipment 225 may be released from random access storage buffer 220 and provided to packing station 230a. In various embodiments, each packing station may be configured to request one or more shipments depending on a measure of that packing stations current workload.

At each packing station, shipments of items (e.g., shipment 225) may be packed into a respective shipping container (e.g., corrugated box or other shipping container) for shipment from the materials handling facility. Prepared shipments may be processed at shipping 70 and conveyed to a shipment carrier for delivery to respective customers.

The illustrated materials handling facility also includes multiple unit handling processes. Generally, any process that moves a unit from a location within the materials handling facility to another location may be considered a unit handling process. For example, picking units of items from inventory 30 to conveyance receptacles 205 may be a unit handling process. The movement of conveyance receptacles 205 to induction stations 210 may also be a unit handling process. Likewise the conveyance of receptacles 215 from induction stations 210 to random access storage buffer 220 may be a unit handling process. The release of shipments from random access storage buffer 220 to packing stations 230 may also be a unit handling process. In various embodiments, each of these unit handling processes may have a respective throughput rate (e.g., units per hour).

Various embodiments of the system and method for managing reassignment of units among shipments in a materials handling facility may control one or more of the unit handling processes to efficiently utilize resources of the materials handling facility without exceeding known constraints of the materials handling facility. This may in some cases include managing the throughput rate of one or more of the unit handling processes. Examples of constraints may include the unit capacity of induction stations 210 or random access storage buffer 220, for example.

Embodiments may include elements for managing the reassignment of units of from one shipment to another shipment within the materials handling facility. In various embodiments, reassignment may be performed to leverage processing variabilities within the materials handling facility. For instance, as illustrated in FIG. 2, units of items are picked from inventory for respective shipments, such as shipments that are prepared to fulfill customer orders. In some cases, a given picked unit may be temporarily delayed on its way to one of induction stations 210. Examples of processing variabilities that may cause such delays include but are not limited to conveyor travel time, agent productivity and agent errors. In one non-limiting example, a unit of a particular item may be delayed sometime prior to arriving at an induction station 210. In the event that another unit of that particular item has arrived at an induction station 210 (e.g., a unit picked to fulfill another shipment), a shipment management component (described below) may be configured to determine whether the unit that has arrived at the induction station should be reassigned from the shipment for which it was picked to the shipment that is waiting on the delayed unit. In various embodiments, this opportunistic reassignment of a unit among shipments may increase the throughput of one or more elements or processes within the materials handling facility. For instance, if a particular shipment within random access storage buffer 220 is waiting on a delayed unit while another unit of the same item has been identified (e.g., at an induction station), opportunistically reassigning that unit to the particular shipment may free up capacity within random access storage buffer 220. For example, if a shipment within random access storage buffer 220 is only waiting on a single unit in order to become complete (e.g., in order to have all units of that shipment present within the buffer), opportunistically reassigning another unit to that shipment may complete that shipment thereby making the shipment eligible for release. Once eligible for release, the shipment management component and/or a buffer management component (describe in more detail below) may create an instruction that causes that shipment to be released from the buffer and provided to one of packing stations 230. In various embodiments, the shipment management component may be configured to utilize various criteria, constraints and/or techniques to determine whether the aforesaid reassignment should be performed; this process is described in more detail below.

Figure 3:
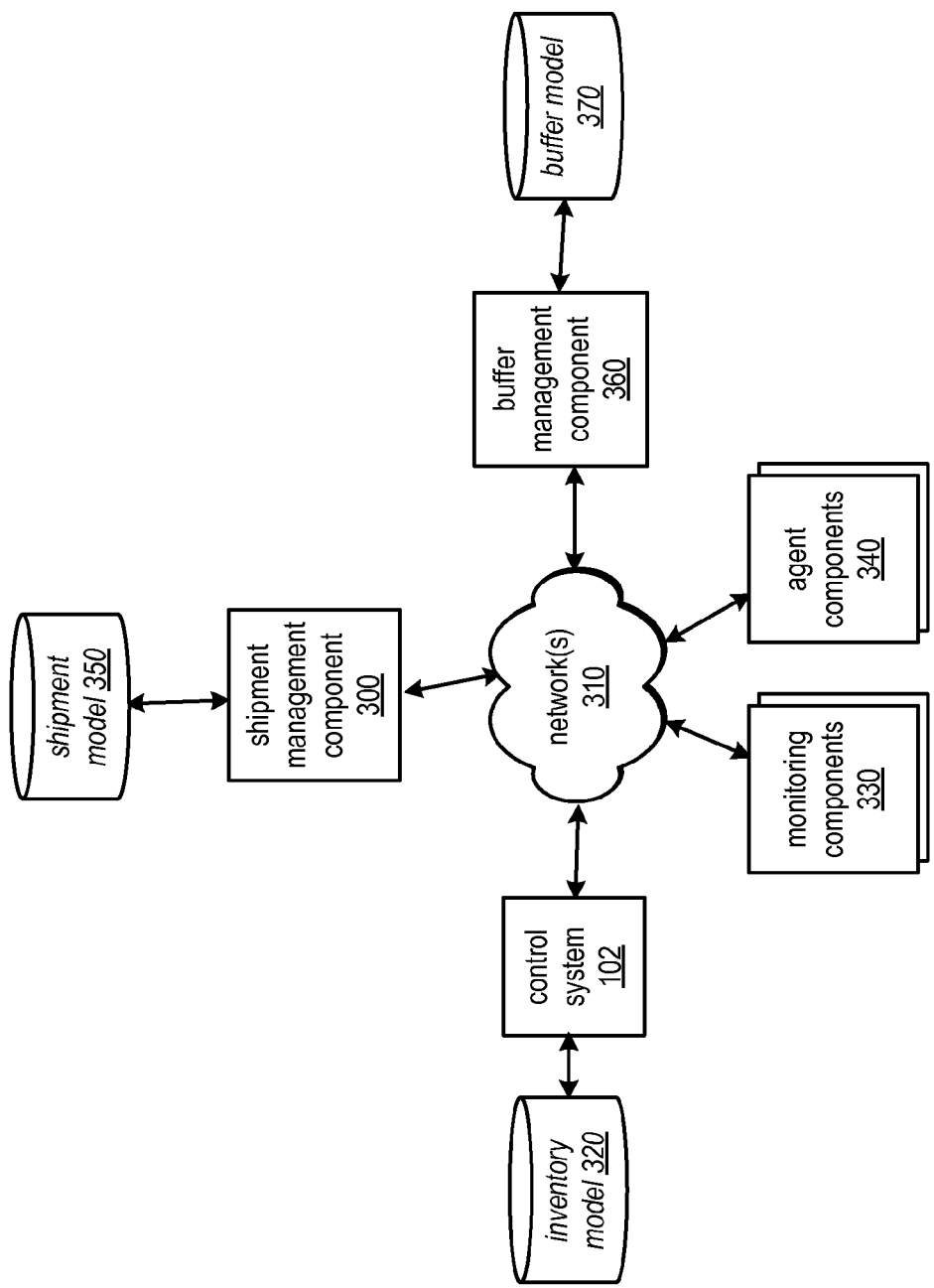
FIG. 3 illustrates an example system configuration including a shipment management component, according to some embodiments.

In various embodiments, the above-describe aspects of managing the reassignment of units may be controlled by a shipment management component. FIG. 3 illustrates an example system configuration that includes such a shipment management component, which is illustrated as shipment management component 300. In the illustrated embodiment of FIG. 3, any of the illustrated components may be implemented on any of one or more computer systems, such as the computer system of FIG. 8. Additionally, any of the illustrated components may communicate over one or more network(s) 310, which may be configured similar to network 885 of FIG. 8.

Control system 102 may be the same as that illustrated in previous figures. In various embodiments, control system 102 may be configured to create, maintain, and/or update an inventory model 320. Inventory model 320 may indicate a real-time or near real-time representation of the location of inventory units with the materials handling facility. Note that the location of a given unit need not be limited to inventory 30. For instance, the location of a unit could be a conveyance receptacle, the location of that conveyance receptacle within the materials handling facility, a conveyance system, random access storage buffer 220, or any other location of the materials handling facility. In various embodiments, as agents handle units throughout the materials handling facility, agent components 340 may scan items into and out of various locations. For instance, agent components 340 may be mobile and/or handheld devices utilized by agents to record the location of units during handling. The agent components may be configured with bar code or RFID scanners in order to read unit identifiers, conveyance receptacle identifiers, and/or location identifiers (e.g., an identifier of a location in inventory, a pack station, etc.). Unit identifiers and/or location identifiers may be sent from agent components 340 to control system 102. Control system 102 may store records that associate a unit with a respective location in inventory model 320. Monitoring components 330 may provide similar information to control system 102. For example, monitoring components may be automated scanners or receivers that track the units within the materials handling facility, in some cases in an automated manner. For instance, monitoring components may represent optical scanners or RFID scanners that are strategically placed within the materials handling facility. The control system may be configured to update the inventory model 320 based on information received from such monitoring components, according to various embodiments.

Shipment management component 300 may be configured to, identify shipments that require a unit (or multiple units) in order to become a complete shipment. In various embodiments, a given shipment may be a complete shipment if all units of that shipment are present within a defined storage area of the materials handling facility. In various embodiments, this defined storage area may be random access storage buffer 220. Likewise, an incomplete shipment may be a shipment for which some but not all units are present within the random access storage buffer 220. For instance, an incomplete shipment may be a shipment awaiting the arrival of one or more units within buffer 220 in order to become a complete shipment that is eligible for release from the buffer.

For a given incomplete shipment identified by the shipment management component, the shipment management component may identify a unit (that was picked from inventory 30 and assigned to another shipment) that may also complete the incomplete shipment if reassigned to the incomplete shipment. In many instances provided herein, the identification of such a unit is described as occurring at an induction station; however, such identification of a unit may occur when the unit is located anywhere else in the materials handling facility, according to some embodiments.

The shipment management component may be configured to determine whether the identified unit should be reassigned in order to complete the incomplete shipment. This determination may be performed according to a variety of criteria, constraints, and/or techniques as described in more detail below. In one example, the shipment management component may be configured to enforce a requirement that ensures a unit can only be reassigned from a given shipment to another shipment if such reassignment will complete the other shipment. In another example, the shipment management component may be configured to enforce a requirement that prevents a unit from being reassigned from a given shipment to another shipment if the given shipment has a shipping deadline (e.g., a date or time by which the shipment must be shipped from the materials handling facility) that is scheduled to occur very soon (e.g., as specified by some time threshold). Numerous other examples of techniques for determining whether a particular unit should be reassigned to a particular incomplete shipment are described in more detail below with respect to later figures.

Shipment model 350 may be a model of any and/or all shipments processed by the materials handling facility. Shipment management component 300 may be configured to generate, maintain, and/or update the information stored within shipment model 350. For a given shipment processed by the materials handling facility, shipment model 350 may indicate one or more items. For each item of the given shipment, shipment model 350 may also provide a quantity of units required by the shipment. For instance, shipment model 350 may specify that an example shipment requires one unit of a particular model of a portable music player and one unit of a particular model of headphones. Of course, other quantities of these items or different items may be required in various embodiments.

In various embodiments, shipment model 350 may also indicate the status of a given shipment's completeness. For instance, as described above, a given shipment may be a complete shipment if all units of that shipment are present within a defined storage area of the materials handling facility (e.g., within random access storage buffer 220). Likewise, an incomplete shipment may be a shipment for which some but not all units are present within the random access storage buffer 220. If a given shipment is a complete shipment (e.g., all units of that shipment reside within buffer 220), shipment model 350 may indicate that the shipment is complete. If a given shipment is incomplete (e.g., one or more units of that shipment are not present within buffer 220), shipment model 350 may indicate that the shipment is incomplete as well as indicate which units of items are needed to make the shipment complete. This information, as well as any of the information stored within shipment model 350, may be utilized by shipment management component 300 when determining whether a unit assigned to one shipment should be reassigned to another shipment, as described in more detail below.

Buffer management component 360 may be configured to control random access storage buffer 220. In various embodiments, buffer management component 360 may control any and/or all aspects of the random access storage buffer 220, including but not limited to the physical mechanisms (e.g., robotic arms, lifts, elevators, etc.) that control the ingress and egress of conveyance receptacles 215 (including respective units) into and out of random access storage buffer 220. Buffer management component 360 may also be configured to generate, maintain and/or update storage area model, such as buffer model 370. In various embodiments, buffer model 370 may be configured to specify information that indicates, for each receptacle received by the random access storage buffer, the location of that receptacle as well as various metadata about the receptacle. In various embodiments, this metadata may specify a shipment identifier (or simply "shipment ID") of the shipment to which the conveyance receptacle is associated. For instance, for a shipment of three units stored in the random access storage buffer, each respective conveyance receptacle (e.g., tray) storing one of such units may be associated together by a common shipment identifier in the buffer model 370. In this way, when shipment management component sends a shipment release request (specifying a shipment ID) to buffer management component 360, buffer management component may evaluate the metadata to determine the trays that are associated with that shipment ID and release those trays (e.g., as described below with respect to FIG. 5). In various embodiments, for a given shipment ID, buffer model 370 may also specify the order in which those trays are to be provided to a pack station. In various embodiments, this order may be generated and provided by shipment management component 300. A receptacle's metadata may also specify the unit within a given receptacle. In this way, for a given shipment (e.g., as identified by shipment ID), buffer model 370 may indicate each tray associated with that shipment as well as each unit of that shipment that is stored within random access storage buffer 220. In various embodiments, subsequent to induction, there may be a one-to-one mapping between conveyance receptacles and respective units.

As described in more detail below, in response to shipment management component 300 determining that a particular unit of a particular item is to be reassigned from a first shipment to a second shipment, shipment management component may be configured to generate one or more instructions to reassign the particular unit from the first shipment to the second shipment. In some embodiments, this instruction (or multiple instructions) may be an instruction to update shipment model 350 and/or buffer model 370 to appropriately reflect the reassignment. In one example, such an instruction may be provided to buffer management component 360 and the buffer management component may perform the reassignment by altering information within buffer model 370.

Figure 4:
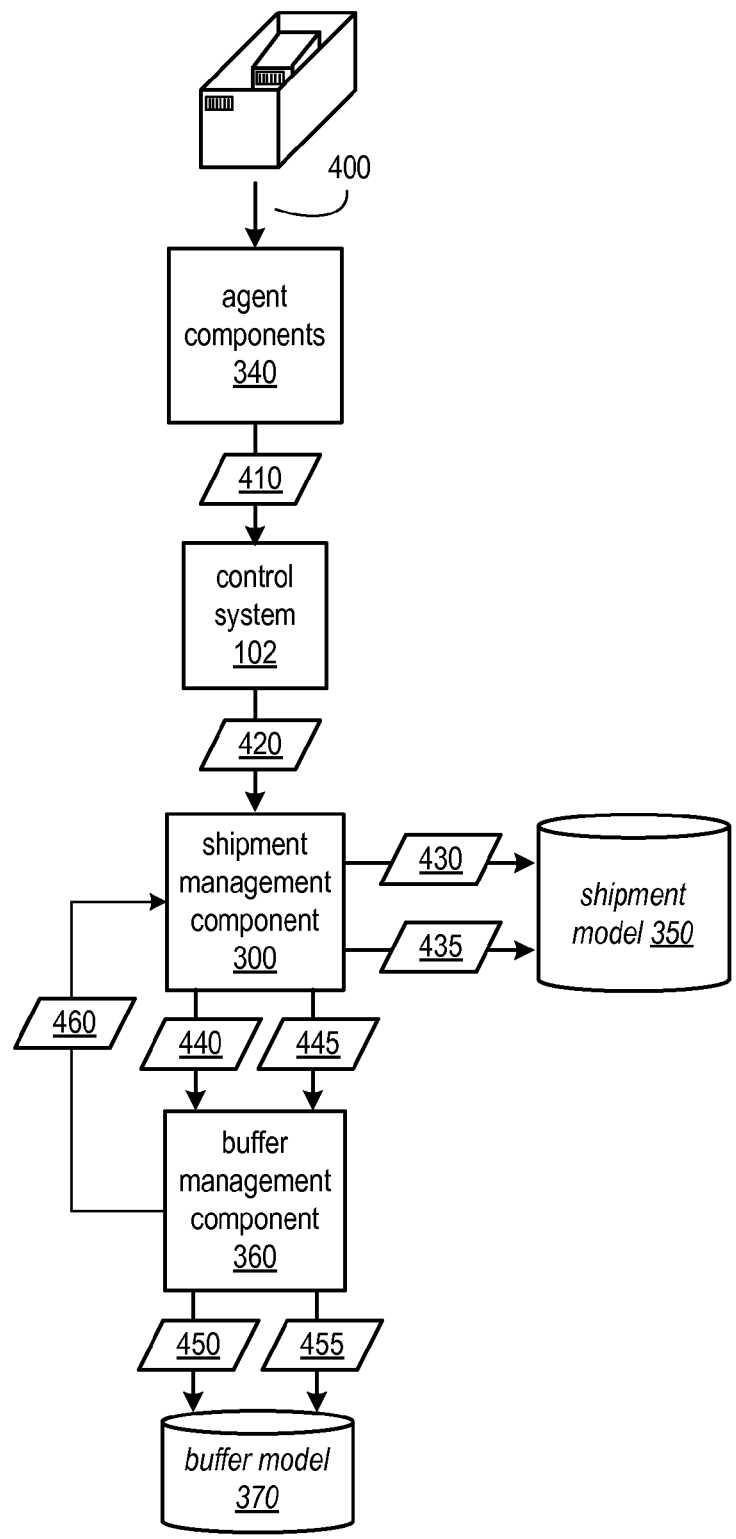
FIG. 4 illustrates an example flow diagram for reassigning one shipment to another shipment, according to some embodiments.

FIG. 4 illustrates an example flow diagram for handling reassignment of units at induction time, according to various embodiments. It should be noted that the illustrated example is non-limiting; in other cases, units may be evaluated elsewhere within the materials handling facility or at some other point in the processing sequence of the materials handling facility.

At 400, a unit is placed within a conveyance receptacle (e.g., a conveyance receptacle 215) at an induction station. In one example, the unit may have just arrived after being picked from inventory 30. Identifiers of the unit and the receptacle may be scanned by an agent component 340 (or, alternatively, a monitoring component 330). These identifiers may be passed to control system 102 as data 410. The control system may update its own inventory model and/or notify shipment management component 300, as illustrated by data 420. This data may serve as a notification that the particular unit has been inducted within a particular receptacle into random access storage buffer 220. In some embodiments, this unit may now be considered to be present within the buffer even if the unit has not yet arrived in a storage location of the buffer. In other embodiments, the unit may not be considered to be present within the buffer unit until it actually arrives at a storage location of the buffer (e.g., after being conveyed from an induction station to the respective location in the buffer). In any case, as illustrated by data 430, shipment management component 300 may update shipment model 350 to indicate that the inducted unit has been assigned to a particular shipment. In various embodiments, this shipment may be the same shipment for which the unit was picked from inventory 30. Shipment management component may receive this information from control system 102 or a pick management component (not illustrated) that controls the picking process. Information similar to 430 may also be provided to buffer management component 360 as data 440. In various embodiments, buffer management component 360 may be configured to updated buffer model 370 with data 450 such that buffer model 370 indicates the inducted unit is assigned to the shipment for which it was originally picked.

In various embodiments, shipment management component 300 may be configured to reassign the inducted unit to a new shipment different than the shipment for which the unit was originally picked. For instance, shipment management component 300 may be configured to identify an incomplete shipment of random access storage buffer 220 (e.g., a shipment for which some but not all units are stored within the buffer) that needs a unit of an item that is the same as that of the inducted unit. For instance, if the unit inducted at 400 were a unit of a particular model of coffee maker, shipment management component 300 may be configured to identify an incomplete shipment that needs a unit of that particular model of coffee maker in order to become a complete shipment (e.g., in order for all of the shipment's units to be present within the random access storage buffer). In other cases, there may be multiple incomplete shipments meeting this criteria; the shipment management component may be configured to select one of those incomplete shipments, as described in more detail with respect to FIGS. 6A-6B. In various embodiments, the shipment management component may perform the above-described analysis based on information received from buffer management component 360. For instance, the buffer management component may provide data 460 to shipment management component 300; this data may indicate all incomplete shipments that currently reside within random access storage buffer 220. The buffer management component may determine this data from buffer model 370. In other cases, shipment management component 300 may determine similar information from shipment model 350.

In response to identifying the inducted unit of a particular item and an incomplete shipment that requires a unit of that particular item, the shipment management component 300 may generate an instruction to reassign the inducted unit from the original shipment for which it was picked to the identified incomplete shipment of buffer management component 360. In some embodiments, shipment management component 300 may only generate the instruction to reassign the unit if doing so will transform the incomplete shipment into a complete shipment. In cases where an incomplete shipment requires one or more units in addition to the inducted unit in order to become a complete shipment, the shipment management component may additionally identify one or more other units currently stored within the random access storage buffer and reassign those units to the incomplete shipment in order to transform the incomplete shipment into a complete shipment.

In the event that the shipment management component generates an instruction to reassign the inducted unit (and/or any other unit) to an incomplete shipment of the random access storage buffer, the instruction may be provided to shipment model 350 (as data 435) and/or to buffer management component 360 (as data 445). Instruction 435 may update shipment model 350 such that the inducted unit is no longer assigned to the shipment for which it was picked and is reassigned to the identified incomplete shipment of the random access storage buffer. Likewise, in response to instruction 445, buffer management component 360 may update buffer model 370 with data 455 such that the buffer model indicates the inducted unit has been reassigned to the identified incomplete shipment.

Once the shipment to which the unit(s) are reassigned has been completed within the random access storage buffer, the shipment management component 300 may designate that shipment as being eligible to be released from the random access storage buffer and provided to a respective packing station to be prepared for shipment from the materials handling facility. The release of shipments is described below with respect to FIG. 5.

Figure 5:
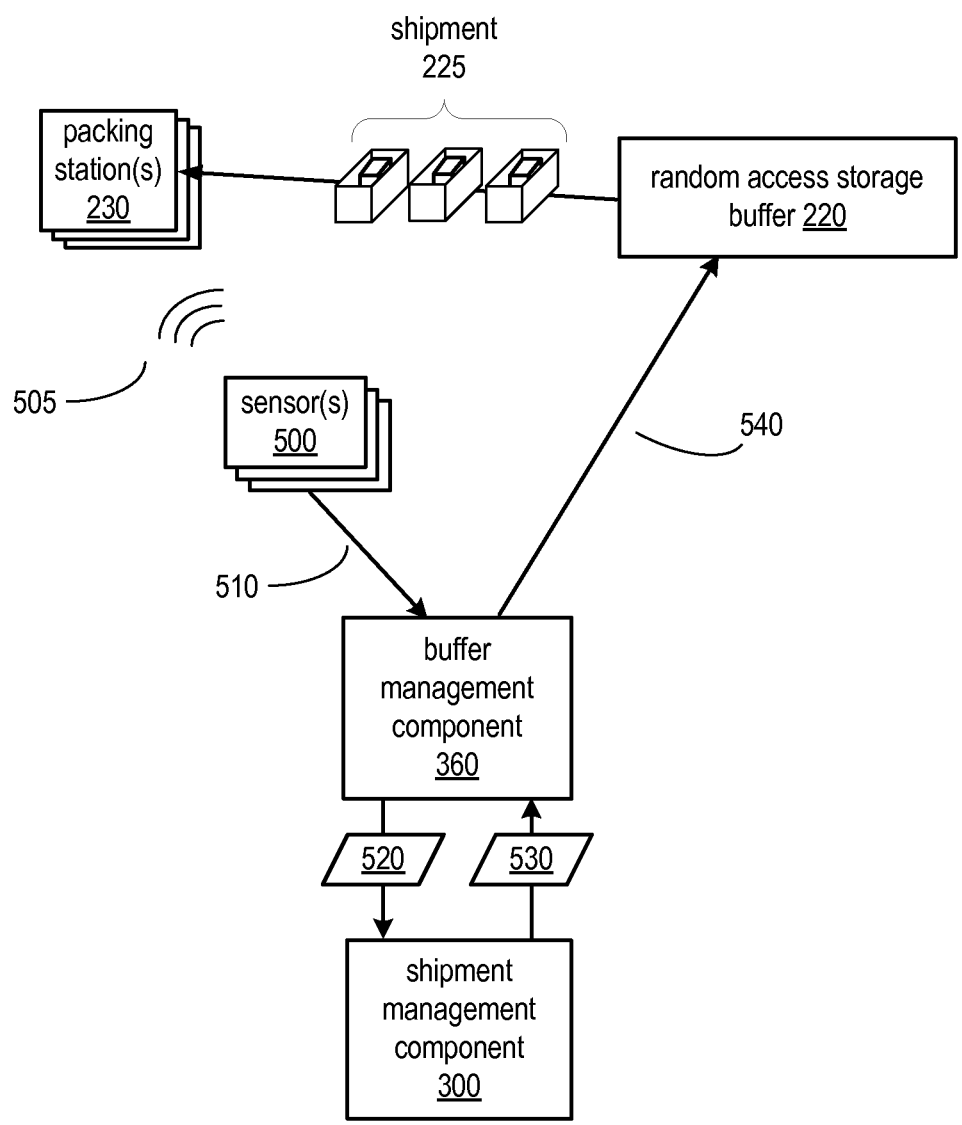
FIG. 5 illustrates an example flow diagram for the release of a shipment, according to some embodiments.

FIG. 5 illustrates an example process for determining that a pack station needs work items (e.g., shipments to pack), determining which work item(s) to provide to the pack station, and generating an instruction to provide the work item(s) to that pack station. As described in more detail below, the particular work item(s) chosen may be based on a variety of criteria.

In the illustrated embodiment, sensor(s) 500 may monitor the workload of each packing station. For instance, each pack station may include a queue or buffer where units released from random access storage buffer 220 accumulate. As a pack station (and/or the agent at that pack station) performs work, units may be removed from that station's queue. Sensor(s) 500 may monitor these queues as illustrated at 505 to determine whether the quantity of work within a pack station's queue has fallen below a threshold quantity (e.g., below a certain number of units or shipments). In response to determining that a particular packing station's work queue has fallen below such a threshold, sensor(s) 500 may generate a notification 510 and provide such notification to buffer management component 360. In one non-limiting example, a given sensor 500 may be a photo eye array.

In response to the notification 510, buffer management component 360 may notify shipment management component 300. This notification is illustrated as data 520. Based on this notification, shipment management component 300 may be configured to determine which shipment is to be released from random access storage buffer 220 and provide the identifier of that shipment to buffer management component 360 as data 530. In various embodiments, shipment management component may determine a universe or domain of multiple shipments to evaluate; the shipment to release may be selected from this domain. In one non-limiting example, the shipment selected for release may include the shipment that is completed according to the techniques described with respect to FIG. 4 above. Data 530 may represent an instruction to release the specified shipment from random access storage buffer 220. In response to this instruction, the buffer management component 360 may control the buffer (illustrated at 540) such that the buffer releases the specified shipment 225 to a respective one of packing stations 230.

Figure 6A:
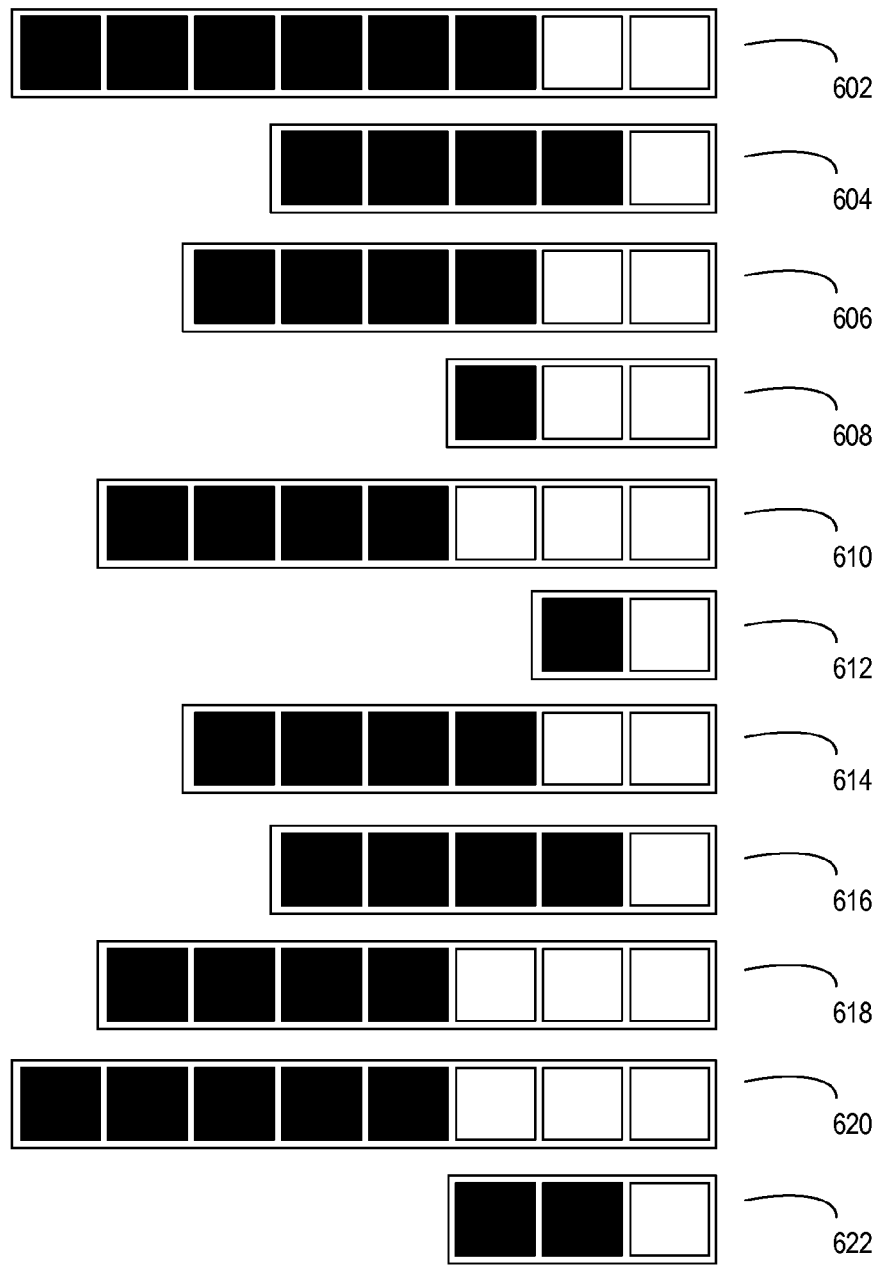
FIGS. 6A-6B illustrate visual representations of the sorting that may be performed in some embodiments in order to determine a shipment to which a unit should be reassigned.
Figure 6A:
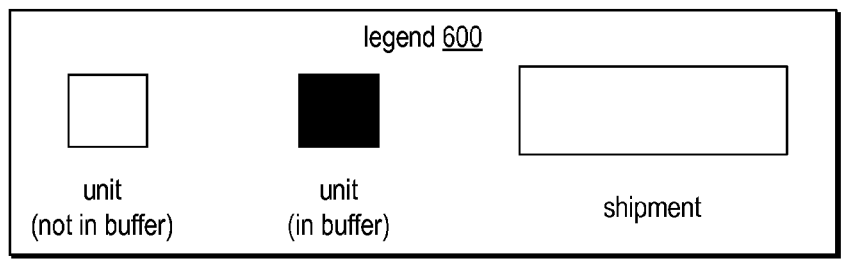

For a given unit that is being considered for reassignment, the shipment management component may select the shipment to which that unit may be reassigned from a group of multiple candidate shipments. In various embodiments, these candidate shipments may be shipments that are incomplete within random access storage buffer 220 (e.g., some but not all units of the shipment are stored within the buffer). The shipment management component may identify this group of candidate shipments from a shipment model (e.g., shipment model 350) or from information received from a component that manages the random access storage buffer (e.g., data 460 received from buffer management component 360). FIG. 6A illustrates an example visual representation of an unsorted group of candidate shipments. For a given unit that is being considered for reassignment (e.g., a unit at an induction station 210), shipment management component 300 may identify a shipment (to which that unit will be reassigned) among candidate shipments 602-622. In the illustrated embodiment of FIG. 6A, candidate shipments 602-622 are not sorted in any particular order. As illustrated by legend 600, each shipment may include units that are not located within random access storage buffer 220 (denoted by a white square) as well units that are located within the random access storage buffer (denoted by a black square).

In various embodiments, the illustrated group of candidate shipments may be a group selected by shipment management component 300. In some embodiments, when selecting the candidate group, the shipment management component may be configured to enforce a requirement that shipments have at least one unit that is not currently located within the random access storage buffer (e.g., each candidate shipment is incomplete). In some embodiments, the shipment management component may be configured to eliminate one or more shipments from being included within the group of candidate shipment in response to determine that those one or more shipments do not have a need for the particular unit being considered for reassignment. In the illustrated embodiments of FIG. 6A, it is assumed that the shipment management component has already enforced the aforesaid requirement of selecting incomplete shipments as well as eliminated one or more shipments according to the aforesaid technique.

Figure 6B:
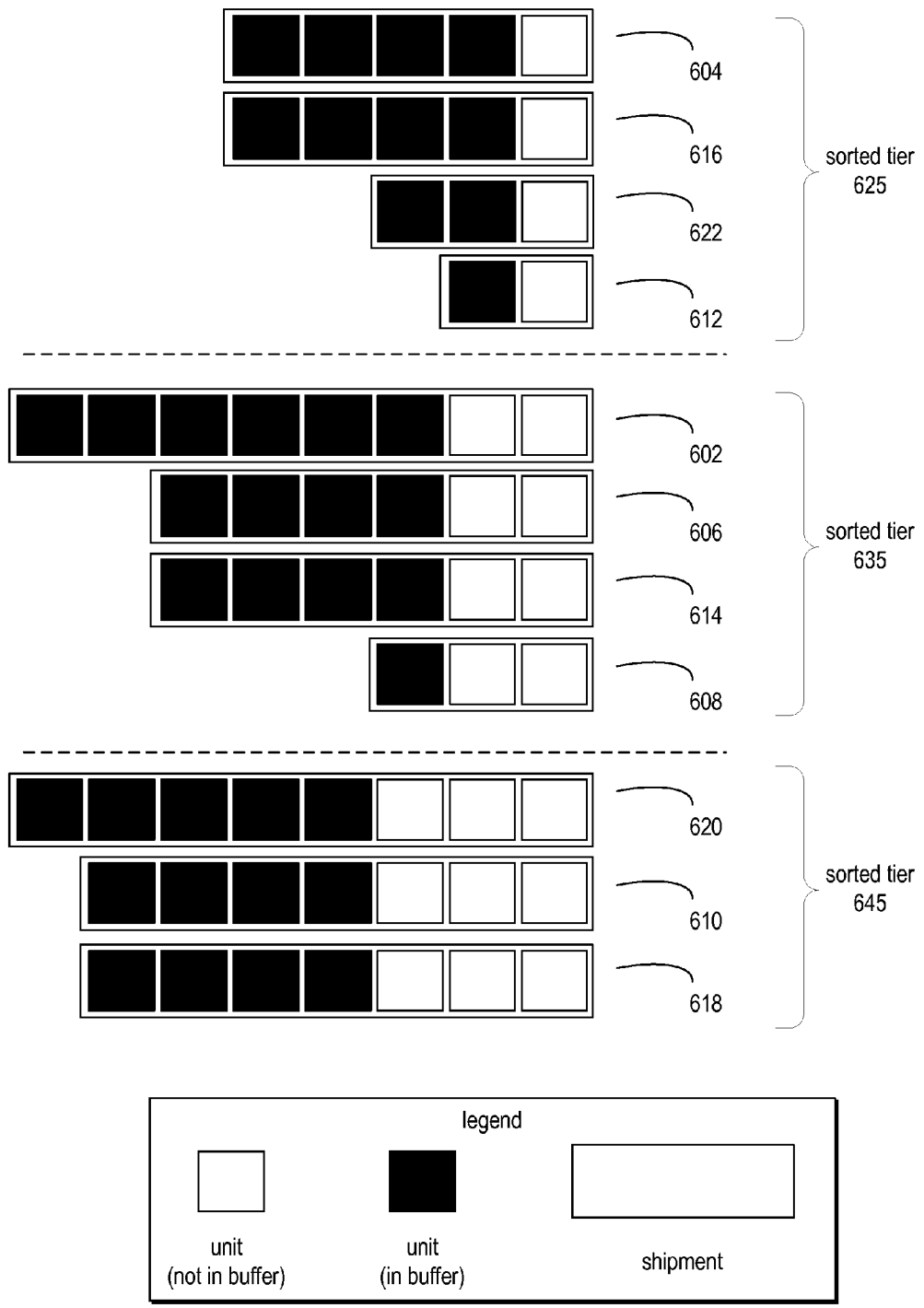

FIG. 6B illustrates the same group of candidate shipments 602-622 after being categorized into distinct tiers and sorted on a tier-by-tier basis. This categorization and sortation process may be utilized by the shipment management component to determine the particular shipment to which the unit described above (e.g., a unit at an induction station) will be reassigned.

As illustrated, shipment management component 300 may be configured to categorize candidate shipments 602-622 into multiple tiers 625, 635 and 645. In various embodiments, the shipment management component may categorize subsets of the candidate shipments into different groups or "tiers" of candidate shipments on the basis of the quantity of units that each candidate shipment requires to become a complete shipment within random access storage buffer 220. For instance, each candidate shipment of tier 625 (shipments 604, 616, 622 and 612) requires one additional unit before becoming a complete shipment within random access storage buffer 220. Additionally, each candidate shipment of tier 635 (shipments 602, 606, 614 and 608) requires two additional units before becoming a complete shipment within random access storage buffer 220. Likewise, each candidate shipment of tier 645 (shipments 620, 610 and 618) requires three additional units before becoming a complete shipment within random access storage buffer 220. Additionally, the individual shipments within each tier may be sorted into a respective order based on one or more criteria. Examples of such criteria may include but are not limited to a total quantity of units that will be in that shipment when complete, a priority level assigned to each shipment, a quantity of time a shipment has resided within the random access storage buffer, and/or a shipping deadline assigned to each shipment. In various embodiments, the shipment management component may be configured to evaluate the candidate shipments according to the respective order to identify the second shipment (e.g., higher-ordered shipments are evaluated before lower-ordered shipments). In one example, when evaluating sorted tier 625, the shipment management component may first evaluate shipment 604, then (if needed) shipment 616, then shipment 622, and finally shipment 612.

In various embodiments, shipment management component 300 may be configured to evaluate the different groups or tiers of candidate shipments in a sequential manner in order to identify the shipment to which the particular unit will be reassigned. For example, to evaluate the different groups in a sequential manner, the shipment management component may evaluate all candidate shipments within one of the tiers (e.g., sorted tier 625) prior to evaluating units of a subsequent tier (e.g., sorted tier 635).

In some embodiments, when evaluating the sorted tiers of candidate shipments to find a shipment to which a particular unit (e.g., a unit that has arrived at an induction station) will be reassigned, the shipment management component may select the first candidate that can be completed by the particular unit (and/or one or more units from the random access storage buffer, if needed). For instance, in one embodiment, shipment 604 may meet these criteria. In this case, the shipment management component may generate one or more instructions to reassign the particular unit form its original shipment (e.g., the shipment to which it was assigned at picking) to shipment 604, which is the first shipment encountered that requires the particular unit. The issuance of such instruction may be performed according to the techniques described above with respect to FIG. 4, for example. In other cases, the shipment management component may be more selective. For instance, the shipment management component may be configured to enforce one or more constraints to eliminate one or more of candidate shipments 602-622 from consideration. Examples of these constraints are described below with respect to FIG. 7.

Example Methods

Embodiments of the system and method for managing reassignment of units among shipments in a materials handling facility may include various methods, such as that of FIG. 7 described below. In various embodiments, methods may be implemented on a computer system, such as that of FIG. 8 described below. In various embodiments, the methods described herein may be performed by shipment management component 300 described above, which may also be implemented on a computer system, such as that of FIG. 8 described below.

Figure 7:
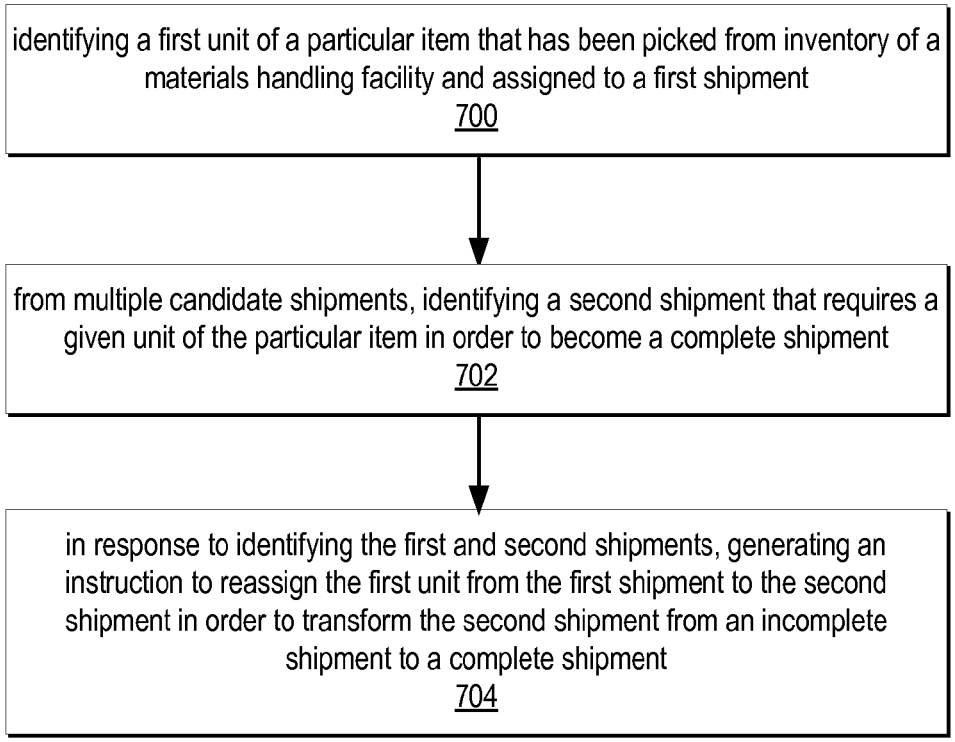
FIG. 7 illustrates a flowchart of an example method for reassigning a unit from a first shipment to a second shipment in order to complete the second shipment, according to some embodiments.

FIG. 7 illustrates a flowchart of an example method for reassigning a unit from a first shipment to a second shipment in order to complete the second shipment. As illustrated by block 700, the method may include identifying a first unit (of a particular item) that has been picked from inventory of a materials handling facility and assigned to a first shipment. Examples of such a unit may include the unit evaluated in regard to FIGS. 4 and 6A-6B described above. For instance, the method may include identifying a unit that has arrived at an induction station after being picked from inventory of the materials handling facility. In other cases, the identified unit may be located elsewhere within the materials handling facility, such as within a defined storage area (e.g., within random access storage buffer 220).

As illustrated by block 702, the method may include, from multiple candidate shipments (e.g., the candidate shipments of FIGS. 6A-6B), identifying a second shipment that requires a given unit of the particular item (e.g., the same type of item as the first unit described with respect to block 700) in order to become a complete shipment. In various embodiments, this may include comparing the first unit to shipments of a shipment model (e.g., shipment model 350) or a storage area model (e.g., buffer model 370) in order to identify multiple candidate shipments (from which the "second" shipment may be selected). As described above, for each candidate shipment, at least one unit assigned to that candidate shipment may have already been picked from inventory and subsequently stored within a defined storage area of the materials handling facility (e.g., within random access storage buffer 220). In various embodiments, each candidate shipment may be an incomplete shipment, which may mean that some but not all of that shipment's units may be stored within random access storage buffer 220. Also as described above, for a given shipment to become a complete shipment in various embodiments, all units of the given shipment must be present within the defined storage area (e.g., within random access storage buffer 220). In various embodiments, a shipment may not be eligible to be released from the random access storage buffer until the shipment has been completed in this manner.

In various embodiments, the method may include enforcing one or more constraints in order to eliminate one or more of the candidate shipments from consideration. In one embodiment, the method may include enforcing a constraint that specifies a given unit cannot be reassigned from a given shipment to another shipment when the given shipment is associated with a priority level that is higher than a priority level to which the other shipment is associated. Different shipments may be assigned different priority levels based on characteristics of the corresponding order. For example, if a customer provides payment for expedited shipping at order time, the corresponding shipments may be assigned a higher priority level than shipments for which regular, non-expedited shipping is specified.

In one embodiment, the method may include enforcing a constraint that specifies a given unit cannot be reassigned from a given shipment to another shipment if all units of the given shipment are present within the defined storage area. For instance, if a shipment is already complete within the random access storage buffer, the method may avoid breaking that shipment up to complete another shipment.

In one embodiment, the method may include enforcing a constraint that specifies a given unit cannot be reassigned from a given shipment to another shipment when the given shipment is associated with a shipping deadline that requires the given shipment to be shipped within a threshold period of time from a current time. For example, if a shipment is near its shipping deadline (e.g., the time by which that shipment is expected to be ready for shipment from the materials handling facility), the method may avoid reassigning units from that shipment to other shipments.

In one embodiment, the method may include enforcing a constraint that specifies a given unit cannot be reassigned from a given shipment to another shipment when the given shipment includes one or more items that have resided within the random access storage buffer for more than a threshold period of time. For instance, for a shipment that has been in an incomplete state for a significant amount of time, the method may avoid removing units from that shipment (in order to facilitate the completion of that shipment). An example scenario in which this may occur includes an incomplete shipment that is waiting for a single, low-volume unit to be restocked within the materials handling facility in order to become complete.

In one embodiment, the method may include enforcing a constraint that specifies a given unit cannot be reassigned from a given shipment to another shipment when a second unit to replace the given unit has not been picked from inventory (where the second unit and the given unit are units of a common item). In this way, the method may in some embodiments ensure that when a unit is reassigned from a shipment, a replacement unit will be available for that shipment.

Note that the constraints described above are merely examples and may not be utilized in all embodiments. More specifically, all, some, or none of the above-described constraints may be enforced in various embodiments of the method. In some cases, modified forms of the above-described constraints (or new constraints altogether) may be used in some cases. Embodiments are not limited to the specific constraints described herein.

As illustrated at block 704, the method may include, in response to identifying the first and second shipments as described with respect to blocks 700 and 702, generating an instruction to reassign the first unit from the first shipment to the second shipment in order to transform the second shipment from an incomplete shipment to a complete shipment. As described above, a complete shipment may be a shipment for which all units are present within a defined storage area, such as random access storage buffer 220. In various embodiments, once a shipment is complete, it may be eligible for release from random access storage buffer 220 and may be provided to a packing station 210 to be prepared for shipment from the materials handling facility.

As described above, embodiments may include a shipment model (e.g., shipment model 350) that maintains the current state of any and/or all shipment-to-unit assignments pertaining to the materials handling facility. In some embodiments, the instruction generated at 704 may be an instruction that updates the shipment model such that the shipment model indicates the first unit is no longer assigned to the first shipment and is now assigned to the second shipment. In embodiments that include a storage area model (e.g., buffer model 370) as described above, the instruction generated at 704 may update such a model in a similar manner.

In various embodiments, the method may include determining that the second shipment described above (e.g., blocks 702-704) may additionally require a unit of another item (which may or may not be the same type of item of block 700) in order to become a complete shipment within the random access storage buffer. In this case, the method may include identifying one or more additional shipments from which units may be reassigned to the second shipment to make the second shipment a complete shipment. For instance, the method may include determining that a third shipment is assigned a particular unit of the item needed by the second shipment in order to become complete. In response to the aforesaid determinations, the method may include generating an instruction to reassign the particular unit from the third shipment to the second shipment in order to transform the second shipment to a complete shipment (in conjunction with the reassignment of the first unit to the second shipment). In one non-limiting example, the first unit (block 700) may be a unit at an induction station while the particular unit described above may be a unit stored within random access storage buffer. Accordingly, the method may in various embodiments reassign units irrespective of whether such units reside inside or outside of the random access storage buffer. Once complete, the second shipment may be eligible for release from random access storage buffer 220 and may be provided to a packing station 210 to be prepared for shipment from the materials handling facility. In various embodiments, the method may include initiating the actual release of the second shipment by generating a release instruction, such as described above with respect to FIG. 5.

Example Computer System

Various embodiments of the system and method for managing reassignment of units among shipments in a materials handling facility, as described herein, may be executed on one or more computer systems, which may interact with various other devices. Note that any component, action, or functionality described above with respect to FIGS. 1-7 may be implemented via one or more computer systems configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 implementing shipment management component 300 are shown stored within program instructions 822. Additionally, data 832 of memory 820 may store any of the information or data structures described above, such as shipment model 350. In some embodiments, program instructions and/or data may be received, sent or stored upon different types of computer-accessible media or on similar media separate from system memory 820 or computer system 800. While computer system 800 is described as implementing the functionality of shipment management component 300, any of the components or systems illustrated above may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices (e.g., any other component of the Figures described above) attached to a network 885 (e.g., any element of FIG. 3) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement any element or action described above. In one embodiment, the program instructions may implement the methods described above, such as the method illustrated by FIG. 7 or the sorting techniques described with respect to FIG. 6. In other embodiments, different elements and data may be included. Note that data 832 may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   a memory; and
   one or more processors coupled to the memory, wherein the memory comprises program instructions executable by the one or more processors to:
      based, at least in part, on one or more constraints, identify a first unit of a particular item that has been picked from inventory of a materials handling facility and assigned to a first shipment for reassignment to a second shipment that requires a given unit of said particular item, wherein at least one unit assigned to the second shipment has already been picked from inventory and subsequently stored within a defined storage area of the materials handling facility; and
      in response to identifying the first unit of the particular item for reassignment to the second shipment, generate an instruction to reassign the first unit of the particular item from the first shipment to the second shipment.

2. The system of claim 1, wherein the program instructions are further configured to:
   determine that the second shipment additionally requires a unit of another item in order to become a complete shipment;
   based, at least in part, on the one or more constraints, identify a particular unit of said other item assigned to a third shipment for reassignment from the third shipment to the second shipment; and
   in response to the determination and the identification of the particular unit of said other item, generate an instruction to reassign the particular unit from the third shipment to the second shipment in order to transform the second shipment to a complete shipment.

3. The system of claim 1, wherein the one or more constraints include at least one of:
   a constraint that specifies a given unit cannot be reassigned from a given shipment to an other shipment when the given shipment is associated with a priority level that is higher than a priority level to which the other shipment is associated;
   a constraint that specifies a given unit cannot be reassigned from a given shipment to an other shipment if all units of the given shipment are present within the defined storage area;
   a constraint that specifies a given unit cannot be reassigned from a given shipment to an other shipment when the given shipment is associated with a shipping deadline that requires the given shipment to be shipped within a threshold period of time from a current time;
   a constraint that specifies a given unit cannot be reassigned from a given shipment to an other shipment when the given shipment includes one or more items that have resided within said defined storage area for more than a threshold period of time; or
   a constraint that specifies a given unit cannot be reassigned from a given shipment to an other shipment when a second unit to replace the given unit has not been picked from said inventory; wherein the second unit and said given unit are units of a common item.

4. The system of claim 1, wherein the materials handling facility comprises one or more induction stations for receiving units picked from said inventory and for subsequently providing the units to the defined storage area, wherein the program instructions are configured to identify said first unit subsequent to the arrival of that unit at one of said induction stations and prior to the storing of that unit within said defined storage area.

5. The system of claim 1, wherein the program instructions are configured to identify said first unit while the first unit resides within said defined storage area of the materials handling facility.

6. The system of claim 1, wherein the program instructions are configured to update a shipment model stored within said memory, wherein for each shipment of multiple shipments processed by the materials handling facility, the shipment model includes information that specifies the units that are assigned to that shipment; wherein said instruction is an instruction to update the shipment model such that the shipment model indicates the first unit has been reassigned from the first shipment to the second shipment.

7. The system of claim 1, wherein units stored within said defined storage area are controlled by a particular component configured to update a storage area model stored within said memory; wherein for each shipment that has at least one unit stored within said defined storage area, the storage area model includes information that associates that unit with a respective shipment; wherein said instruction is an instruction to update said storage area model such that the storage area model indicates that said first unit has been reassigned to said second shipment.

8. The system of claim 1, wherein the reassignment of the first unit of the particular item from the first shipment to the second shipment transforms the second shipment from an incomplete shipment to a complete shipment, wherein for a given shipment to become a complete shipment, all units of the given shipment must be present within the defined storage area, and wherein the program instructions are configured to:
   subsequent to said second shipment becoming a complete shipment, generate an instruction to release the second shipment from the defined storage area to a respective packing station to be prepared for shipment from the materials handling facility.

9. A method, comprising:
performing, by one or more computing devices:
- based, at least in part, on one or more constraints, identifying a first unit of a particular item that has been picked from inventory of a materials handling facility and assigned to a first shipment for reassignment to a second shipment that requires a given unit of said particular item, wherein at least one unit assigned to the second shipment has already been picked from inventory and subsequently stored within a defined storage area of the materials handling facility; and
- in response to identifying the first unit of the particular item for reassignment to the second shipment, generating an instruction to reassign the first unit of the particular item from the first shipment to the second shipment.

10. The method of claim 9, wherein said defined storage area includes a random access storage buffer comprising multiple locations at which units are stored.

11. The method of claim 9, further comprising:
- determining that the second shipment additionally requires a unit of another item in order to become a complete shipment within said defined storage area;
- based, at least in part, on the one or more constraints, identifying a particular unit of said other item assigned to a third shipment for reassignment to the second shipment; and
- in response to the determination and the identification of the particular unit, generating an instruction to reassign the particular unit from the third shipment to the second shipment in order to transform the second shipment to a complete shipment.

12. The method of claim 9, wherein the one or more constraints include at least one of:
- a constraint that specifies a given unit cannot be reassigned from a given shipment to an other shipment when the given shipment is associated with a priority level that is higher than a priority level to which the other shipment is associated;
- a constraint that specifies a given unit cannot be reassigned from a given shipment to an other shipment if all units of the given shipment are present within the defined storage area;
- a constraint that specifies a given unit cannot be reassigned from a given shipment to an other shipment when the given shipment is associated with a shipping deadline that requires the given shipment to be shipped within a threshold period of time from a current time;
- a constraint that specifies a given unit cannot be reassigned from a given shipment to an other shipment when the given shipment includes one or more items that have resided within said defined storage area for more than a threshold period of time; or
- a constraint that specifies a given unit cannot be reassigned from a given shipment to an other shipment when a second unit to replace the given unit has not been picked from said inventory; wherein the second unit and said given unit are units of a common item.

13. The method of claim 9, wherein said generating the instruction to reassign the first unit of the particular item from the first shipment to the second shipment comprises updating a shipment model such that the shipment model indicates the first unit has been reassigned from the first shipment to the second shipment, wherein for each shipment of multiple shipments processed by the materials handling facility, the shipment model includes information that specifies the units that are assigned to that shipment.

14. The method of claim 9, wherein the reassignment of the first unit of the particular item from the first shipment to the second shipment transforms the second shipment from an incomplete shipment to a complete shipment, wherein for a given shipment to become a complete shipment, all units of the given shipment must be present within the defined storage area, and wherein the method further comprises:
- subsequent to said second shipment becoming a complete shipment, generating an instruction to release the second shipment from the defined storage area to a respective packing station to be prepared for shipment from the materials handling facility.

15. A non-transitory, computer-readable storage medium storing program instructions that when executed by one or more computing devices cause the one or more computing devices to implement:
- based, at least in part, on one or more constraints, identifying a first unit of a particular item that has been picked from inventory of a materials handling facility and assigned to a first shipment for reassignment to a second shipment that requires a given unit of said particular item, wherein at least one unit assigned to the second shipment has already been picked from inventory and subsequently stored within a defined storage area of the materials handling facility; and
- in response to identifying the first unit of the particular item for reassignment to the second shipment, generating an instruction to reassign the first unit of the particular item from the first shipment to the second shipment.

16. The non-transitory, computer-readable storage medium of claim 15, wherein the program instructions cause the one or more computing devices to further implement:
- determining that the second shipment additionally requires a unit of another item in order to become a complete shipment within said defined storage area;
- based, at least in part, on the one or more constraints, identifying a particular unit of said other item assigned to a third shipment for reassignment to the second shipment; and
- in response to the determination and the identification of the particular unit, generating an instruction to reassign the particular unit from the third shipment to the second shipment in order to transform the second shipment to a complete shipment.

17. The non-transitory, computer-readable storage medium of claim 15, wherein the one or more constraints include at least one of:
- a constraint that specifies a given unit cannot be reassigned from a given shipment to an other shipment when the given shipment is associated with a priority level that is higher than a priority level to which the other shipment is associated;
- a constraint that specifies a given unit cannot be reassigned from a given shipment to an other shipment if all units of the given shipment are present within the defined storage area;
- a constraint that specifies a given unit cannot be reassigned from a given shipment to an other shipment when the given shipment is associated with a shipping deadline that requires the given shipment to be shipped within a threshold period of time from a current time;
- a constraint that specifies a given unit cannot be reassigned from a given shipment to an other shipment when the given shipment includes one or more items that have resided within said defined storage area for more than a threshold period of time; or a constraint that specifies a given unit cannot be reassigned from a given shipment to an other shipment when a second unit to replace the given unit has not been picked from said inventory; wherein the second unit and said given unit are units of a common item.

18. The non-transitory, computer-readable storage medium of claim 15, wherein said first unit is identified while the first unit resides within said defined storage area of the materials handling facility.

19. The non-transitory, computer-readable storage medium of claim 15, wherein said generating the instruction to reassign the first unit of the particular item from the first shipment to the second shipment comprises updating a shipment model such that the shipment model indicates the first unit has been reassigned from the first shipment to the second shipment, wherein for each shipment of multiple shipments processed by the materials handling facility, the shipment model includes information that specifies the units that are assigned to that shipment.

20. The non-transitory, computer-readable storage medium of claim 15, wherein the reassignment of the first unit of the particular item from the first shipment to the second shipment transforms the second shipment from an incomplete shipment to a complete shipment, wherein for a given shipment to become a complete shipment, all units of the given shipment must be present within the defined storage area, and wherein the program instructions further cause the one or more computing devices to implement:

subsequent to said second shipment becoming a complete shipment, generating an instruction to release the second shipment from the defined storage area to a respective packing station to be prepared for shipment from the materials handling facility.

\* \* \* \* \*